July 6, 1965 T. KOPCZYK 3,192,914
POWER AND PUMPING APPARATUS
Filed Feb. 25, 1963 3 Sheets-Sheet 1
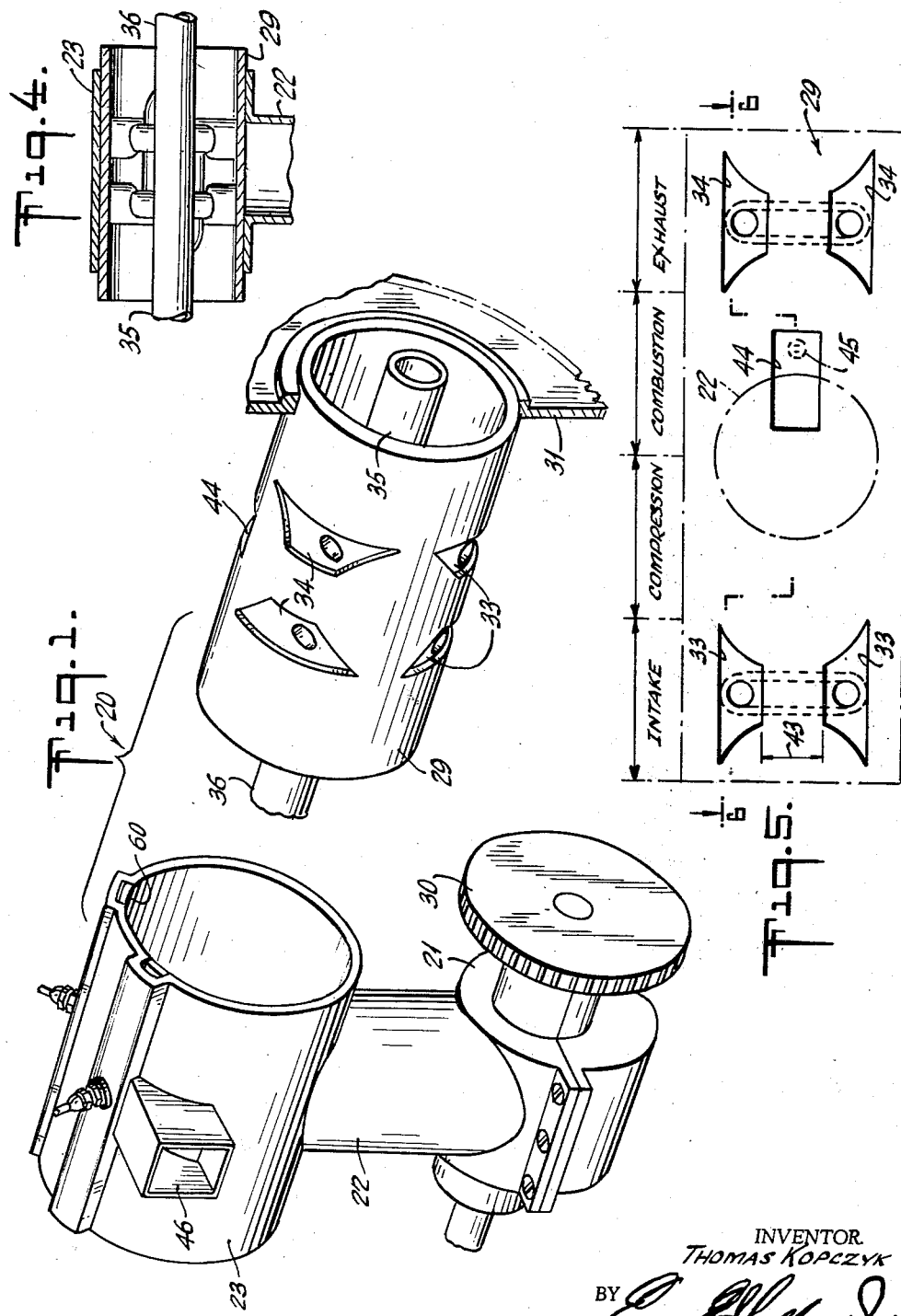
INVENTOR.
THOMAS KOPCZYK
BY
ATTORNEY

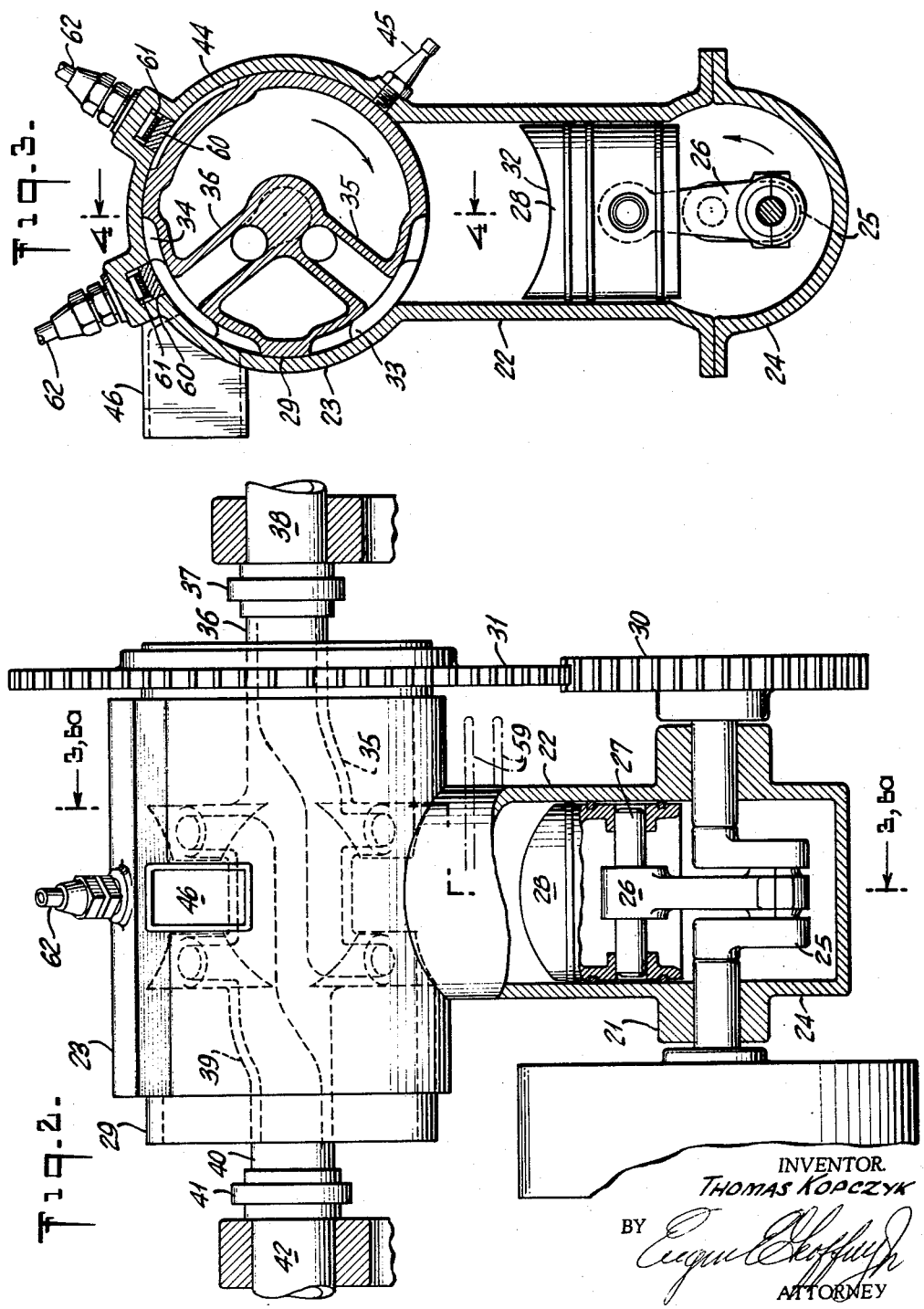

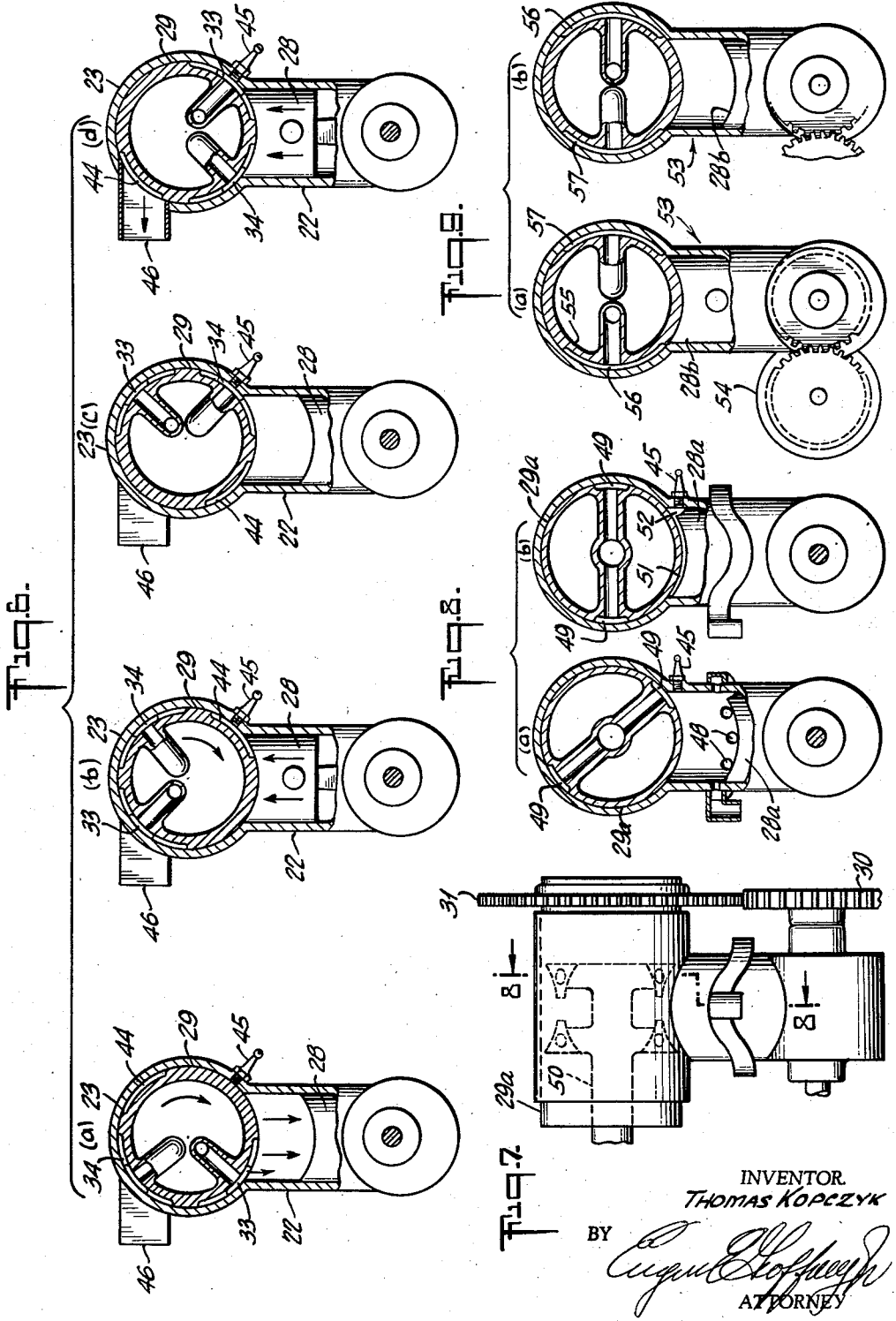

United States Patent Office 3,192,914
Patented July 6, 1965

3,192,914
POWER AND PUMPING APPARATUS
Thomas Kopczyk, 105 Magnolia Ave., Jersey City, N.J.
Filed Feb. 25, 1963, Ser. No. 260,424
3 Claims. (Cl. 123—78)

This invention relates to improvements in power and pumping apparatus.

In the field of valved machinery, such as engines, pumps, and the like, the presence of the usual reciprocating valves entails such disadvantages as multiplicity of parts, liability to noise and vibration, and particularly in case of internal combustion engines, severe limitations as to the feasible optimum shape and degree of volume reduction possible in the compression space structure.

An object of the present invention is to provide valved apparatus in which a single rotary cylindrical valve member performs all the valving operations throughout the operative cycle of the device.

A further object is to provide an internal combustion piston engine structure in which residual exhaust space within the cylinder or cylinders may be reduced substantially to operational zero.

Another object is to provide an internal combustion engine including a laterally axled rotary cylindrical head valve member having formed therein the combustion chamber or chambers of the engine as well as the valving provisions.

A further object is to provide rotary head valving apparatus which is advantageously adapted for use in two-stroke cycle internal combustion engines, as well as in pumps, compressors, external combustion engines, and the like.

Other objects and advantages of the invention will become evident during the course of the following description in connection with the accompanying drawings, in which:

FIGURE 1 is an exploded perspective view of the invention as applied to a four-cycle internal combustion engine.

FIGURE 2 is a semi-diagrammatic partly vertical sectional view illustrative of the invention as applied to the four-stroke cycle internal combustion engine exemplified in FIG. 1.

FIGURE 3 is a jogged vertical sectional view of FIG. 2 taken along the line 3—3 thereof.

FIGURE 4 is a fragmental detail vertical section of the valving head structure of FIGS. 1, 2 and 3.

FIGURE 5 is a developed view of the valving and combustion chamber relation for a typical "four-cycle" internal combustion engine.

FIGURES 6a through 6d inclusive show diagrammatically the successive positions and operations of the apparatus as adapted to a four-cycle engine.

FIGURE 7 is a semi-diagrammatic side elevation of a "two-cycle" embodiment of the invention.

FIGURES 8a and 8b respectively illustrate exhaust-intake and ignition positions in the "two-cycle" (two-stroke cycle) embodiment of the invention.

FIGURES 9a and 9b show the rotary cylindrical head valving provision as applied to a pump or, with obvious modifications in discharge valve extent, to a compressor.

It will be understood that in the interest of clarity the drawings exhibit the invention in forms simplified to illustrate the inventive concept per se, rather than including the countless routine constructional details that may be embodied in the device in its obvious commercial applications.

Referring to FIG. 1, the numeral 20 generally denotes a four-cycle internal combustion engine having a main block structure including an upper crankcase portion 21, a vertical power cylinder 22, and a horizontal cylindrical head valve casing 23. The crankcase portion 21, together with its matching lower or pan portion 24, has journalled therein a crankshaft 25 as illustrated in FIGS. 2 and 3, a connecting rod 26 and wrist pin 27 linking the crankshaft with a piston 28, the latter being slidably fitted in the cylinder 22.

A combined head and head member 29 of cylindrical configuration is rotatably mounted in the top casing 23, being accurately fitted to form a rotating seal therewith. The head member 29 is adapted to be rotated by the crankshaft 25 with a two-to-one or half-speed reduction via suitable driving means such as gears 31 and 31. The head 32 of the piston 28 is cylindrically concave with a radius of curvature very slightly greater than the peripheral radius of the rotary head member 29, and in the four-cycle engine embodiment illustrated, the piston head 32 at top dead center has substantially negligible clearance with the head member 29 as shown in FIGS. 6b and 6d.

The outer surface of the member 29 has formed therein a pair of longitudinally spaced inlet ports 33 and a similarly spaced pair of exhaust ports 34. The inlet ports 33 open into an internal manifold 35 from which a short concentrically disposed pipe 36 connects via a suitable rotary seal 37 with a stationary intake conduit 38 of FIG. 2. Similarly, the exhaust ports 34 are connected via an internal manifold 39, a concentric stub pipe 40 and a rotary seal 41, with a stationary exhaust pipe 42.

The developed peripheral view of the head and valve member 29 in FIG. 5 illustrates typically the general form and the cyclic relationships of the exhaust and inlet ports with respect to each other and to the cylinder 22 in the four-cycle embodiment under consideration. Thus, the ports are illustrated as of generally isosceles trapezoidal form having their sloped leading and trailing edges generally corresponding respectively to rotarily aligned lead-in and lead-out internal circumferential upper edge segments of the cylinder 22, in rotarily parallel zones spaced apart by a central zone 43. It will be evident to those skilled in the art that by the above-noted shaping and edge relationships, the arcuate sweep of the ports across the upper end of the cylinder 32 results in maximum freedom of net valve opening combined with sharp initiation and cut-off of such opening, by which means the cyclic succession of valve relations to piston position, valving overlap, etc., may be determined with optimum regard to size, speed, and service applications of the particular power plant required.

In addition to the above-described valve provisions, the member 29 has formed in the periphery thereof a segmental cavity 44 which by its volume and its location with respect to the valve ports provides a moving clearance or combustion chamber above the piston head 32 when required by the cycle.

In operation, the successive relative positions of the parts are as shown in FIGS. 6a through d, it being understood in the interest of clarity as previously noted, that the internal inlet and exhaust conduits have been illustrated as slender passages purely representative of the relatively large passages employed in practice and shown in FIG. 4.

FIG. 6a illustrates the piston 28 completing its suction or intake stroke while the inlet valve ports 33 are moving clockwise to effect cutoff shortly after bottom dead center, in accordance with established four-cycle engine timing practice. In FIG. 6b, the piston 23 has just completed its compression stroke, the head cavity 44 meanwhile having moved into position as shown to receive the compressed charge. The charge thereupon is ignited by means of a spark plug 45 and drives the piston downward while the head cavity 44 sweeps out of registry with the spark plug and across the upper end of the cylinder 22 during the power stroke. The exhaust ports 34 start their registry with the cylinder 22 shortly before bottom dead center of the power stroke as illustrated in FIG. 6c. Finally the piston 22 rises to the top of its exhaust stroke to complete the four-stroke cycle as shown in FIG. 6d. Due to the previously noted very close approach of the concave piston head 32 to the rotary valving head member 29, the cylinder is cleared practically completely of exhaust gases, the only such gas remaining in the system being a small residual amount in the moving head concavity 44. To allow escape of this small fraction, an auxiliary port 46 is provided in casing 23 for registry with the cavity 44. It will be evident to those skilled in the art that the features described provide substantially 100 percent exhaust scavenging with minimum dilution of the following intake charge and resultant maximum power delivery.

In the "two-cycle" (two stroke cycle) engine embodiment of the invention as illustrated in FIGS. 7 and 8, a plurality of exhaust port 48 is provided in the wall of the cylinder 22a, these ports preferably being disposed in an undulant circumferential row so as to be uncovered uniformly by the piston 28 during a small lower portion of its reciprocal travel through bottom dead center position. The rotary head member 29a is formed with inlet ports 49 connected to a common concentric manifold 50 adapted to receive charging mixture under pressure from any suitable type of blower or if desired by crankcase compression provision in a well-known manner. The incoming charge, entering the top of the cylinder 22a after opening of the exhaust ports 48, completes evacuation of the exhaust gases through these ports with an all downward or uniflow action which minimizes mixing and again results in optimum purity of working charge. If desired, this embodiment may allow for compression space 51 between the piston 28a and the rotary head member 29a when the piston is at the top of its stroke, with a notch 52 in the piston head providing access of the spark plug 45 to the compressed charge. In the embodiment shown, the rotary valve and head member 29a is rotated at one-half crankshaft r.p.m. as in the case of the four-cycle machine, two sets of diametrically opposite inlet ports 49 being embodied to establish the two-stroke cycle. Obviously, the member 29a may instead be driven at crankshaft r.p.m. and accordingly provided with a single set of inlet ports, but the dual structure is generally preferred in point of rotational balance.

FIGS. 9a and 9b illustrate the advantages of rotational valving and related features of the invention in their application to pumps, compressors, steam or external combustion engines, as well as to the internal combustion engine embodiments set forth at length. Thus, these figures illustrate an oil pump 53 driven by a motor 54, and employing a rotary head member 55 formed with peripheral valve ports 56 and 57 adapted to be swept across zones of the upper end of the cylinder 58 in appropriate timed relation to the strokes of the piston 28b.

As previously noted, the invention is shown in largely diagrammatic form in the interests of clarity and simplicity, it being understood that in practice it may employ a number of well-known provisions common to the art, such as water jackets for cooling the internal combustion engine embodiments, or alternately, for air cooling by means of any desired arrangement of flanges 59 of FIG. 2. Similarly, lubrication for the rotary head member may be furnished by such means as perforate distributing strips 60 pressed radially inward by strip springs 61 of FIGS. 1 and 3, and receiving oil under pressure via exterior connecting tubes 62. Alternatively or conjunctively, of course, the internal combustion embodiments of the apparatus may be adapted to be lubricated by admixture of oil with the gasoline. With respect to both the four-stroke cycle and two-stroke cycle types of internal combustion engines embodying the invention, it will be obvious that in the case of compression-ignition types, the illustrated spark plug 45 would be replaced by suitable injection means. In any of the engine types, the rotary head member 29 may be open ended and provided with internal fan blades or the like, thus forcing air through the interior of the head to augment the exterior cooling means. Thus, while the invention has been set forth in preferred form, it is not limited to the precise embodiments illustrated, as various modifications may be made without departing from the spirit of the invention within the scope of the appended claims.

What is claimed is:

1. In an internal combustion engine for operation on a four-stroke cycle, in combination, a crankshaft, a cylinder, a piston operatively connected to said crankshaft for reciprocation in said cylinder, a hollow cylindrical casing of greater internal diameter than said cylinder and intersecting the outer end of said cylinder at right angle thereto, a generally hollow cylindrical head and valve member disposed in rotatable sealing relation in said casing, said piston being formed with an arcuately concave head which approaches said rotary cylindrical head and valve member to a point of substantially negligible clearance therewith at the outer end of said piston's stroke, means forming peripheral inlet and exhaust valve ports in said rotary member in circumferentially displaced relationship predetermined in accordance with said four-stroke cycle operation, conduit means including manifolds within said rotary member and rotary tubular joints connecting said peripheral inlet and exhaust ports to exterior inlet and exhaust means respectively, means forming a combustion cavity in the periphery of said rotary head member axially displaced from said ports and circumferentially disposed in four-stroke cyclically determined locational relation to said ports, positive means interconnecting said rotary member and crankshaft to drive said rotary head and valve member from said crankshaft at timed two-to-one rotational speed reduction, whereby said rotary member may sweep said ports and said combustion chamber into and out of communication with the interior of said cylinder in cyclic cooperation with four successive strokes of said piston, ignition means disposed at the interior surface of said casing and communicating with said combustion cavity during a portion of the registry of said cavity with said cylinder, and means forming an auxiliary exhaust port in said casing remote from said cylinder and disposed to be operatively opened to and by said moving combustion cavity.

2. The combination according to claim 1 wherein said rotatable head and valve member is open ended, whereby cooling air may be directed to the interior of said member.

3. The combination according to claim 1 wherein said valve ports are of developed shapes approximating trapezoids with parallel edges disposed in rotational planes of said rotary head and valve member.

References Cited by the Examiner

UNITED STATES PATENTS

| 1,160,292 | 11/15 | Lafon | 123—80 |
| 1,388,758 | 8/21 | Rahmeter | 123—190 |
| 1,471,789 | 10/23 | Gove | 123—80 |
| 1,731,998 | 10/29 | Coates | 123—190 |
| 2,048,134 | 7/36 | Monalto | 123—190 |
| 2,379,344 | 6/45 | Etessan et al. | 123—80 |

FOREIGN PATENTS

| 429,983 | 6/35 | Great Britain. |
| 198,493 | 12/38 | Switzerland. |

MARK NEWMAN, *Primary Examiner.*

FRED E. ENGELTHALER, *Examiner.*